United States Patent
Jeong et al.

(10) Patent No.: US 8,625,654 B2
(45) Date of Patent: Jan. 7, 2014

(54) PULSE GENERATOR OF UWB SYSTEM

(75) Inventors: Jin Doo Jeong, Daejeon (KR); Hyung Soo Lee, Daejeon (KR); Sangsung Choi, Daejeon (KR); Franklin Bien, Ulsan (KR); Yun ho Choi, Ulsan (KR); Young su Kim, Ulsan (KR)

(73) Assignees: Electronics and Telecommunications Research Institute, Daejeon (KR); Unist Academy-Industry Research Corporation, Ulsan (KR)

( * ) Notice: Subject to any disclaimer, the term of this patent is extended or adjusted under 35 U.S.C. 154(b) by 211 days.

(21) Appl. No.: 13/326,185

(22) Filed: Dec. 14, 2011

(65) Prior Publication Data

US 2012/0163416 A1 Jun. 28, 2012

(30) Foreign Application Priority Data

Dec. 23, 2010 (KR) .......................... 10-2010-0133666

(51) Int. Cl.
*H04B 1/00* (2006.01)

(52) U.S. Cl.
USPC ........................................................ 375/130

(58) Field of Classification Search
USPC .......... 375/130, 238, 239, 373, 376; 370/212; 327/149, 158
See application file for complete search history.

(56) References Cited

U.S. PATENT DOCUMENTS

| | | | | |
|---|---|---|---|---|
| 7,295,053 B2 * | 11/2007 | Lesso | ............................. | 327/158 |
| 7,746,128 B2 * | 6/2010 | Kim | ............................. | 327/116 |
| 7,795,933 B2 * | 9/2010 | Yu et al. | ......................... | 327/156 |
| 8,058,913 B2 * | 11/2011 | Kim et al. | ..................... | 327/149 |
| 2009/0168942 A1 * | 7/2009 | Choi et al. | .................... | 375/373 |

OTHER PUBLICATIONS

Youngmin Park et al., "IR-UWB Transmitters Synthesized from Standard Digital Library Components", 2010, p. 3296-3299, IEEE.

* cited by examiner

*Primary Examiner* — Khanh C Tran

(57) ABSTRACT

A pulse generator of an ultra wideband (UWB) system includes: a plurality of delay cells for receiving pulses, delaying the received pulses for a predetermined time, and outputting the delayed pulses; and an edge combiner connected to output ends of the plurality of delay cells for receiving the delayed pulses from the plurality of delay cells, outputting fine pulses corresponding to the delayed time, and generating one impulse signal with the outputted fine pulses. The edge combiner includes a plurality of XOR gates for receiving a first delayed pulse and a second delayed pulse from an $n^{th}$ delay cell and an $(n+1)^{th}$ delay cell among the plurality of delay cells and generating fine pulses, respectively, and an OR gate for receiving a first fine pulse and a second fine pulse respectively output from a first XOR gate and a second XOR gate included in the plurality of XOR gates.

7 Claims, 4 Drawing Sheets

PULSE GENERATOR OF UWB SYSTEM

CROSS-REFERENCE TO RELATED APPLICATION

This application claims priority to and the benefit of Korean Patent Application No. 10-2010-0133666 filed in the Korean Intellectual Property Office on Dec. 23, 2010, the entire contents of which are incorporated herein by reference.

BACKGROUND OF THE INVENTION (a) Field of the Invention

The present invention relates a pulse generator of an ultra-wideband (UWB) system.

(b) Description of the Related Art

In general, an ultra wideband (UWB) system occupies a wider frequency bandwidth than an existing frequency bandwidth. Here, the wider frequency bandwidth means occupying about 20% of the center frequency bandwidth or occupying a frequency bandwidth higher than about 500 MHz. A reason for occupying a wider frequency bandwidth is to communicate without interfering with other narrowband signals by dispersing signal energy to ultra wideband.

In order to have such a wide frequency, a very short pulse is required in a time domain. When such a short pulse is used for communication, a signal can be transmitted with low power consumption due to a low duty cycle, and a transmitted signal is resistant to multipath noise.

As an ultra wideband (UWB) system, a low speed UWB standard system was introduced in IEEE 802.15.4a in 2006. The ultra wideband (UWB) system is generally classified into an impulse radio-UWB (IR-UWB) system using an impulse signal, a chirp spread spectrum (CSS) system using a chirp signal, and a chaotic based UWB system using a chaotic signal like noise.

Particularly, the IR-UWB system has been widely used because there is no limitation in pulse configuration and it has strong correlation characteristic in a distance measurement algorithm such as range. Since the IR-UWB system can be realized with low power consumption, the IP-UWB system can be easily applied to a wireless personal area network (WPAN) or a wireless body area network (WBAN).

Further, it has been a recent trend to exclude a LO/MIXER from a transmitting/receiving unit of an IR-UWB system as a non-coherent system for ultra low power consumption. The LO/MIXER consumes a large amount of power in a transmitting/receiving unit of a communication system. If the LO/MIXER is replaced with a low power consuming unit, a large power gain can be achieved.

In order to replace the LO/MIXER, a method using an all-digital pulse generator has been receiving attention. The all-digital pulse generator is an ultra low power consuming unit because the all-digital pulse generator only consumes power for CV2 that is changed according to capacitance and for sub-threshold leakage. A typical all-digital pulse generator will be described in detail with reference to FIG. 1.

FIG. 1 is a diagram illustrating a typical pulse generator of a UWB system.

As shown in FIG. 1, a typical all-digital pulse generator is a major element in an IR-UWB system excluding a LO/MIXER. Realization of an all-digital pulse generator is directly related to overall system performance and a low cost system. A typical all-digital pulse generator receives pulses modulated through a pulse position modulation (PPM) scheme, and delays the received pulse for a predetermined time using delay cells so as to generate delayed input signals.

The typical all-digital pulse generator outputs a predetermined number of rising/falling edges of the delayed input signals through a mask register having an AND gate, and generates an impulse signal to be used for communication through an edge combiner using an XOR gate tree. The edges having passed through the XOR gates are generated as a fine pulse width having a duty cycle of as much as a delay interval. A center frequency of an impulse signal is determined based on the fine pulse width. The mask register controls a bandwidth of the generated impulse signal by determining the number of fine pulses.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an all-digital pulse generator suitable for a 0.13 um CMOS process through an OR gate.

An exemplary embodiment of the present invention provides a pulse generator of an ultra wideband (UWB) system including: a plurality of delay cells for receiving pulses, delaying the received pulses for a predetermined time, and outputting the delayed pulses; and an edge combiner connected to output ends of the plurality of delay cells for receiving the delayed pulses from the plurality of delay cells, outputting fine pulses corresponding to the delayed time, and generating one impulse signal with the outputted fine pulses. The edge combiner includes: a plurality of XOR gates for receiving a first delayed pulse and a second delayed pulse from an $n^{th}$ delay cell and an $(n+1)^{th}$ delay cell among the plurality of delay cells and generating fine pulses, respectively; and an OR gate for receiving a first fine pulse and a second fine pulse respectively output from a first XOR gate and a second XOR gate included in the plurality of XOR gates and generating one impulse signal with the first fine pulse and the second file pulse. Another exemplary embodiment of the present invention provides a pulse generator of an ultra wideband (UWB) system including: a channel setup unit for controlling a number of fine pulses to be output in order to select a channel to transmit a signal according to a control signal input with a pulse; and an OR gate unit for receiving fine pulses output from the channel setup unit and generating one impulse signal with the received fine pulses. The channel setup unit includes: a plurality of delay cells for delaying input pulses for a predetermined time and outputting delayed pulses; and a plurality of XOR gates for receiving a first delayed pulse and a second delayed pulse output from an $n^{th}$ delay cell and an $(n+1)^{th}$ delay cell among the plurality of delay cells and generating fine pulses.

DETAILED DESCRIPTION OF THE EMBODIMENTS

Figure 1:
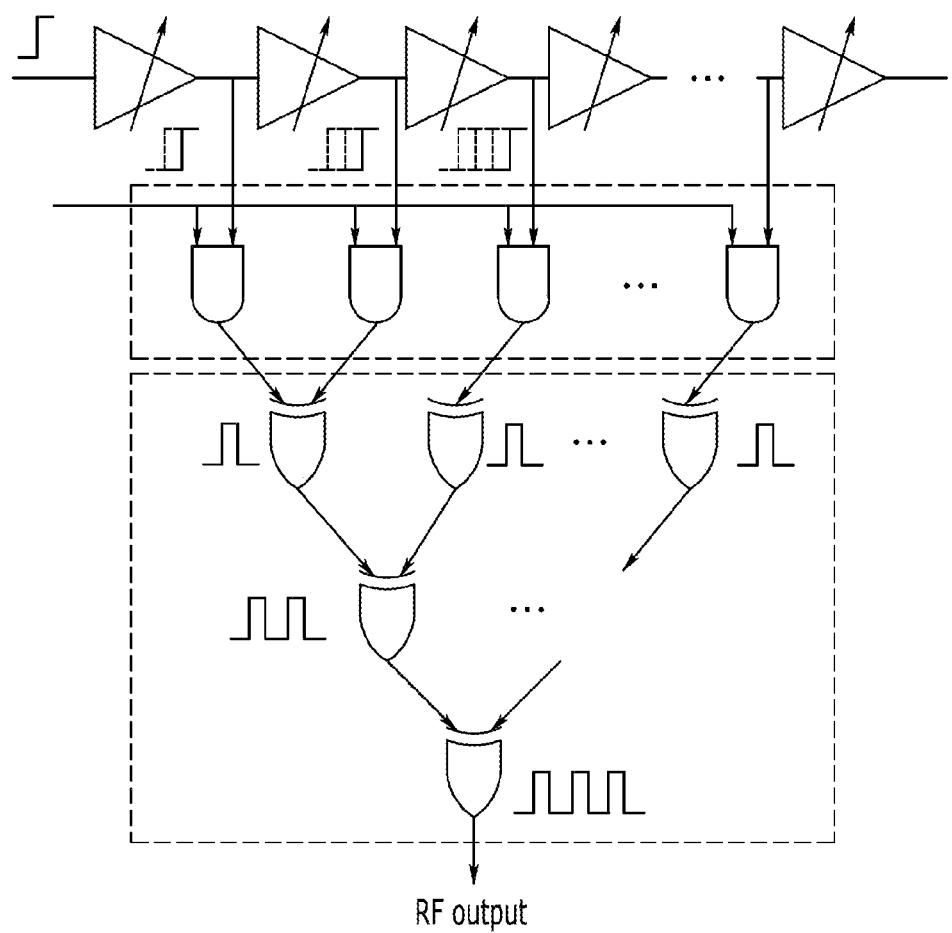
FIG. 1 is a diagram illustrating a typical pulse generator of an UWB system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, an all-digital oscillator suitable for a 0.13 nm CMOS process according to an exemplary embodiment of the present invention will be described with reference to the accompanying drawings.

Figure 2:
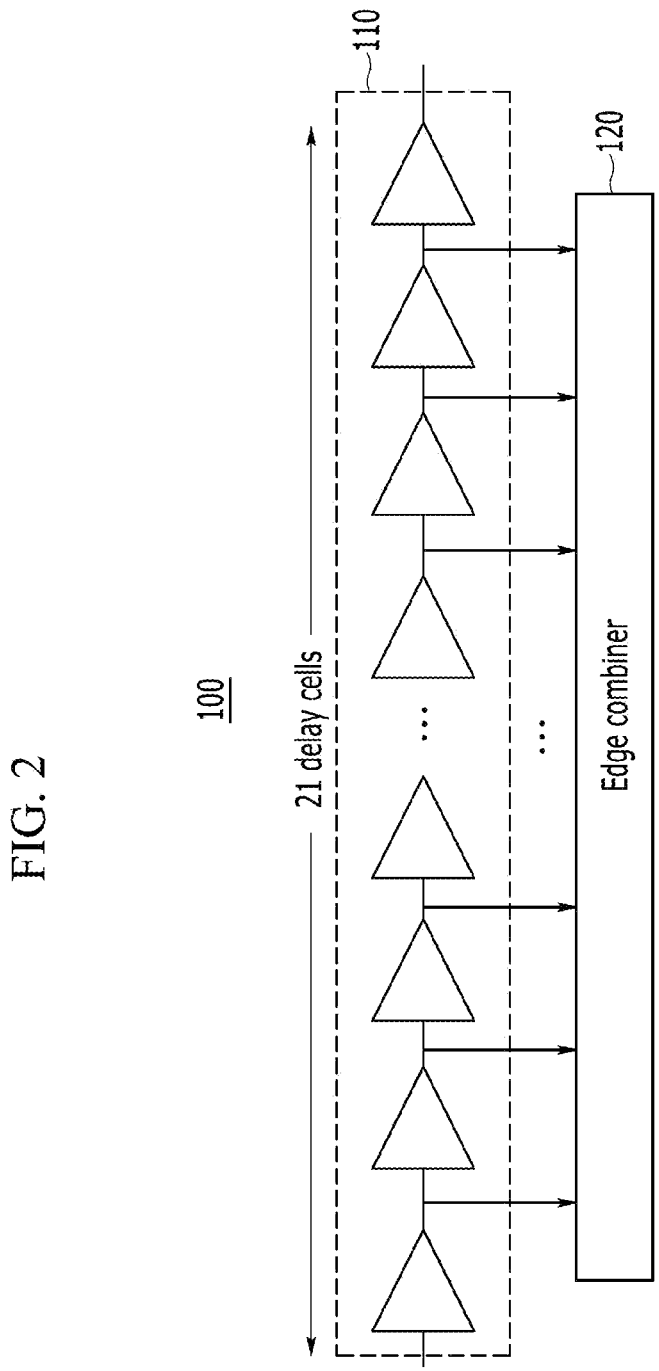
FIG. 2 is a configuration diagram illustrating an all-digital pulse generator according to an exemplary embodiment of the present invention.
Figure 3:
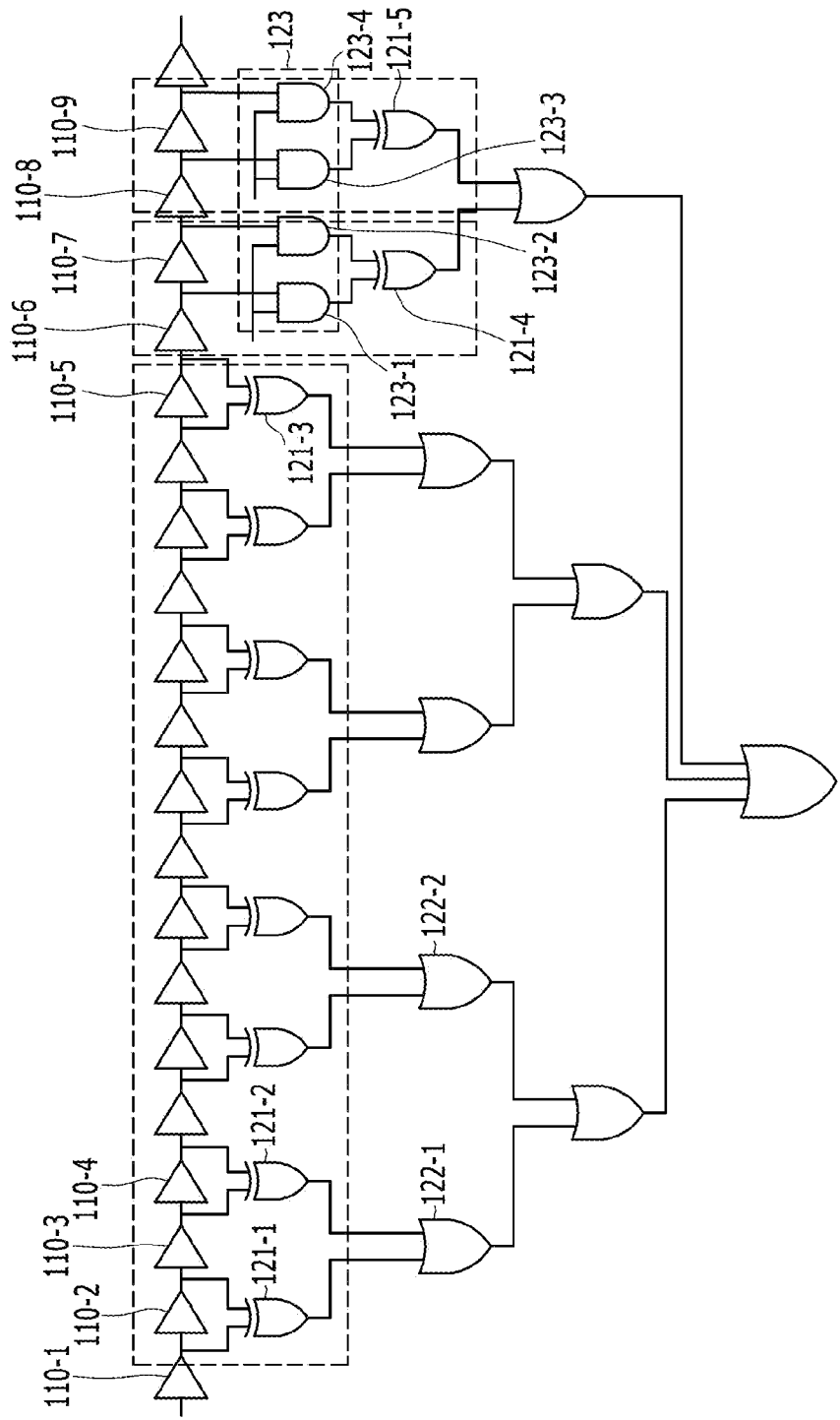
FIG. 3 is a configuration diagram illustrating an all-digital pulse generator according to an exemplary embodiment of the present invention.

FIG. 2 is a configuration diagram illustrating an all-digital pulse generator according to an exemplary embodiment of the present invention, and FIG. 3 is a detailed configuration diagram illustrating an all-digital pulse generator according to an exemplary embodiment of the present invention.

As shown in FIG. 2, the all-digital pulse generator 100 according to an exemplary embodiment of the present invention includes a plurality of delay cells 110 and an edge combiner 120.

The plurality of delay cells 110 are connected in series. In an exemplary embodiment of the present invention, twenty-one delay cells 110 are connected in series. The plurality of delay cells 110 receive a PPM modulated pulse and generate twenty delayed signals. A process of generating a delayed signal by delaying a modulated signal through the delay cells 110 is well-known to those ordinarily skilled in the art. Accordingly, a detailed description thereof is omitted therein.

The edge combiner 120 receives a plurality of delayed signals generated from the delay cells 110 and generates a plurality of fine pulses of as much as a delayed time. The edge combiner 120 generates one impulse signal with the plurality of generated fine pulses. For example, the edge combiner 120 generates ten fine pulses because twenty delayed signals are generated in the exemplary embodiment of the present invention. The edge generator 120 according to an exemplary embodiment of the present invention includes a plurality of XNOR gates, a plurality of AND gates, and a plurality of OR gates.

In an exemplary embodiment of the present invention, the edge generator 120 initially uses a low band of a typical UWB frequency bandwidth, and changes a band by controlling the delay cells according to use of a channel. In an exemplary embodiment of the present invention, a channel is divided into three channels such as a first channel, a second channel, and a third channel.

A center frequency of the first channel is about 3.496 GHz, and a delay time Δt thereof is about 143 ps. A center frequency of the second channel is about 4000 GHz, and a delay time Δt thereof is about 125 ps. A center frequency of the third channel is about 4.504 GHz, and a delay time Δt thereof is about 111 ps. A channel setup unit controls the number of fine pluses according to a use of each channel. The channel setup unit includes a plurality of delay cells, an XOR gate, and an AND gate. The channel setup unit is connected to an OR gate. The OR gate receives fine pulses output from the channel setup unit and generates one impulse signal with them.

In other words, the channel setup unit is divided into a first channel setup unit, a second channel setup unit, and a third channel setup unit. The first channel setup unit includes a plurality of delay cells and an XOR gate. The second channel setup unit and the third channel setup unit include a plurality of delay cells, an AND gate, and an XOR gate. Through the channel setup unit, the number of fine pulses output from the channel setup unit output is controlled, and a channel is selected based on the controlled number of fine pluses.

In more detail, a plurality of delay cells 110 are coupled in series as shown in FIG. 3. Then, the outputs of the plurality of delay cells 110 are input to the edge combiner 120.

The edge combiner 120 is not a typical edge combiner that is installed in a general pulse generator and includes only XOR gates. Unlike the typical edge combiner, the edge combiner 120 includes an XOR gate 121, an OR gate 122, and an AND gate 123. That is, the XOR gate 121 is disposed for generating a plurality of fine pulses using edges of a plurality of delayed signals from the plurality of delay cells 110, and the OR gate 122 is disposed for generating one impulse signal with the plurality of fine pulses generated from the XOR gate 121. The AND gate 123 is disposed at output ends of predetermined delay cells among the plurality of delay cells 110 according to channel use in order to be used for one of the first to third channels.

In other words, an output of a first delay cell 110-1 and an output of a second delay cell 110-2 are input to a first XOR gate 121-1 of the edge combiner 110. An output of a third delay cell 110-3 and an output of a fourth delay cell 110-4 are input to a second XOR gate 121-2. That is, the outputs from the first delay cell 110-1 to a sixteenth delay cell 110-5 are input to first to eighth XOR gates 121-1 to 121-3 respectively.

The first to sixteenth delay cells 110-1 to 110-5 and the first to eighth XOR gates 121-1 to 121-3 generating fine pulses using the delayed signals therefrom are configured to be operated at the first channel. In the exemplary embodiment of the present invention, each one of elements operating in the first channel is set up as default.

Remaining delay cells following the sixteenth delay cell are configured as the second channel and the third channel. That is, the second channel includes a seventeenth delay cell 110-6, an eighteenth delay cell 110-7, a first AND gate 123-1, a second AND gate 123-2, and a ninth XOR gate 121-4. The third channel includes a nineteenth delay cell 110-8, a twentieth delay cell 110-9, a third AND gate 123-3, a fourth AND gate 123-4, and a tenth XOR 121-5. Here, the first AND gate 123-1 to the fourth AND gate 123-4 operate according to a control signal input with a pulse and transmit a signal using the second channel or the third channel.

In more detail, it is assumed that a signal period is about 10 ns, a delay d of a delay cell is about 1 ns. The first and second delay cells 110-1 and 110-2 receive a signal and output a pulse that is delayed for 1 ns and a pulse that is delayed for 2 ns. This is because all delay cells have the same delay period. Then, the first XOR gate 121-1 generates two fine pulses. In an exemplary embodiment of the present invention, the first XOR gate outputs only one generated first fine pulse from two generated fine pulses.

After generating the fine pulses, the first OR gate 122-1 connected to output ends of the first XOR gate 121-1 and the second XOR gate 121-2 receives the two fine pulses and generates one impulse signal with the two fine pulses. Logical functions of an XOR gate and an OR gate after generating the fine pulses are compared with reference to FIG. 4.

Figure 4:
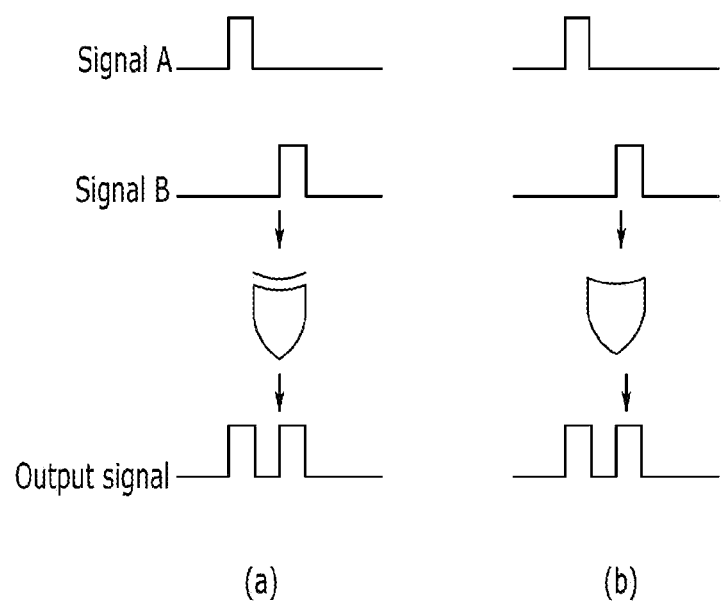
FIG. 4 is a diagram for comparing logical functions of an XOR gate and an OR gate after generating fine pulses according to an exemplary embodiment of the present invention.

FIG. 4 is a diagram for comparing logical functions of an XOR gate and an OR gate after generating fine pulses.

As shown in FIG. 4, when one fine pulse is generated, the XOR gate and the OR gate perform a logically same function and generate the same type of impulse signal. As is known, comparatively uniform impulse signals may be generated by combining edges using only one XNOR gate.

However, this may be overcame by controlling a size ratio of transistors forming an OR gate. Further, the number of transistors used for an OR gate is smaller than the number of transistors used for an XOR gate. Accordingly, the manufacturing cost can be reduced because of a smaller semiconductor main body area.

As shown in (a) of FIG. 4, an XOR gate receives an output pulse A and an output pulse B and generates one impulse signal by performing an exclusive OR operation on the received pulses A and B. As shown in (b) of FIG. 4, the same result can be obtained using an OR gate. Therefore, the OR gate is used in an exemplary embodiment of the present invention in order to reduce the manufacturing cost thereof because of a smaller semiconductor main body area and by reducing the number of transistors.

According to an exemplary embodiment of the present invention, the number of transistors can be reduced, and a small semiconductor main body area (die area) and a low cost can be realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A pulse generator of an ultra wideband (UWB) system, comprising:
    a plurality of delay cells for receiving pulses, delaying the received pulses for a predetermined time, and outputting the delayed pulses; and
    an edge combiner connected to output ends of the plurality of delay cells for receiving the delayed pulses from the plurality of delay cells, outputting fine pulses corresponding to the delayed time, and generating one impulse signal with the outputted fine pulses,
    wherein the edge combiner includes:
    a plurality of XOR gates for receiving a first delayed pulse and a second delayed pulse from an $n^{th}$ delay cell and an $(n+1)^{th}$ delay cell among the plurality of delay cells and generating fine pulses, respectively; and
    an OR gate for receiving a first fine pulse and a second fine pulse respectively output from a first XOR gate and a second XOR gate included in the plurality of XOR gates and generating one impulse signal with the first fine pulse and the second file pulse.

2. The pulse generator of claim 1, wherein the edge combiner further comprises
    an AND gate connected to output ends of predetermined delay cells among the plurality of delay cells for controlling outputting delayed pulses from the connected delay cells to the XOR gate according to a control signal input with the pulse.

3. The pulse generator of claim 2, wherein the AND gate controls the pulse generator to transmit a signal from one of first to third channels.

4. The pulse generator of claim 1, wherein the XOR gate selects one generated first from two fine pulses generated from the first delayed pulse and the second delayed pulse and outputs the selected one.

5. A pulse generator of an ultra wideband (UWB) system, comprising:
    a channel setup unit for controlling a number of fine pulses to be output in order to select a channel to transmit a signal according to a control signal input with a pulse; and
    an AND gate unit for receiving fine pulses output from the channel setup unit and generating one impulse signal with the received fine pulses,
    wherein the channel setup unit includes:
    a plurality of delay cells for delaying input pulses for a predetermined time and outputting delayed pulses; and
    a plurality of XOR gates for receiving a first delayed pulse and a second delayed pulse output from an $n^{th}$ delay cell and an $(n+1)^{th}$ delay cell among the plurality of delay cells and generating fine pulses.

6. The pulse generator of claim 5, wherein the channel setup unit includes an AND gate connected to output ends of predetermined delay cells among the plurality of delay cells and controlling outputting of the delayed pulses from the connected delay cells to the XOR gate.

7. The pulse generator of claim 6, wherein the channel setup unit includes a first channel setup unit, a second channel setup unit, and a third channel setup unit,
    wherein the first channel setup unit includes a plurality of delay cells and a plurality of XOR gates connected to output ends of the plurality of delay cells, and
    wherein the second channel setup unit and the third channel setup unit include a plurality of delay cells, a plurality of AND gates connected to output ends of the plurality of delay cells, and an XOR gate connected to output ends of the plurality of AND gates.

* * * * *